United States Patent
Bex et al.

(10) Patent No.: US 9,469,277 B2
(45) Date of Patent: Oct. 18, 2016

(54) WIPING DEVICE

(75) Inventors: Koen Bex, Jeuk/Limburg Belgien (BE); Helmut Depondt, Kessel-Lo (BE); Dirk Herinckx, Dries-Linter (BE)

(73) Assignee: Robert Bosch GmbH, Stuttgart (DE)

( * ) Notice: Subject to any disclaimer, the term of this patent is extended or adjusted under 35 U.S.C. 154(b) by 367 days.

(21) Appl. No.: 14/130,000

(22) PCT Filed: May 21, 2012

(86) PCT No.: PCT/EP2012/059361
§ 371 (c)(1),
(2), (4) Date: Dec. 30, 2013

(87) PCT Pub. No.: WO2013/000626
PCT Pub. Date: Jan. 3, 2013

(65) Prior Publication Data
US 2014/0137360 A1  May 22, 2014

(30) Foreign Application Priority Data

Jun. 28, 2011 (DE) .................. 10 2011 078 174

(51) Int. Cl.
*B60S 1/40* (2006.01)
*B60S 1/38* (2006.01)

(52) U.S. Cl.
CPC .............. *B60S 1/40* (2013.01); *B60S 1/3853* (2013.01); *B60S 1/381* (2013.01); *B60S 1/3851* (2013.01); *B60S 1/3856* (2013.01); *B60S 1/3858* (2013.01); *B60S 1/3881* (2013.01); *B60S 2001/3818* (2013.01)

(58) Field of Classification Search
CPC ........ B60S 1/40; B60S 1/381; B60S 1/3856; B60S 1/3858; B60S 1/3853; B60S 1/3851
USPC .................. 15/250.32, 250.31, 250.451
See application file for complete search history.

(56) References Cited

U.S. PATENT DOCUMENTS

| 3,390,416 A | * | 7/1968 | Scinta | ................. B60S 1/3801 |
| | | | | 15/250.32 |
| 6,581,237 B1 | * | 6/2003 | Kotlarski | ................. B60S 1/38 |
| | | | | 15/250.32 |
| 7,350,259 B2 | * | 4/2008 | Walworth | ............. B60S 1/3856 |
| | | | | 15/250.201 |

(Continued)

FOREIGN PATENT DOCUMENTS

| CN | 1849236 | 10/2006 |
| CN | 101432170 | 5/2009 |

(Continued)

OTHER PUBLICATIONS

International Search Report for Application No. PCT/EP2012/059361 dated Aug. 9, 2012 (2 pages).

*Primary Examiner* — Michael Jennings
(74) *Attorney, Agent, or Firm* — Michael Best & Friedrich LLP

(57) ABSTRACT

The invention relates to a wiping device, in particular a wiping device for a motor vehicle pane, comprising a retaining element (10*a*-10*f*) with at least one longitudinal guide channel (18*a*-18*f*) for guiding at least one spring element (20*a*-20*f*). According to the invention, the retaining element (10*a*-10*f*) has at least three fixing cavities (26*a*-26*f*, 28*a*-28*f*, 30*a*-30*f*, 32*a*) that are offset in the longitudinal direction (22*a*-22*f*) and that are provided in order to interlock with a wiper blade adapter (12*a*-12*f*).

14 Claims, 9 Drawing Sheets

(56) References Cited

U.S. PATENT DOCUMENTS

| | | | |
|---|---|---|---|
| 7,464,434 B2 * | 12/2008 | Chiang | B60S 1/386 15/250.32 |
| 7,587,783 B1 * | 9/2009 | Lin | B60S 1/3858 15/250.201 |
| 8,438,692 B2 * | 5/2013 | Ollier | B60S 1/3858 15/250.31 |
| 8,782,845 B2 * | 7/2014 | Bousset | B60S 1/386 15/250.31 |
| 2008/0127442 A1 * | 6/2008 | Jarasson | B60S 1/38 15/250.361 |
| 2008/0150193 A1 * | 6/2008 | Walworth | B29C 33/76 264/310 |
| 2008/0263809 A1 * | 10/2008 | Bousset | B60S 1/386 15/250.32 |
| 2009/0056049 A1 * | 3/2009 | Jarasson | B60S 1/381 15/250.32 |
| 2010/0293737 A1 * | 11/2010 | Ollier | B60S 1/3858 15/250.34 |

FOREIGN PATENT DOCUMENTS

| | | |
|---|---|---|
| CN | 101983147 | 3/2011 |
| DE | 10036115 | 1/2003 |
| DE | 102008001045 | 10/2009 |
| EP | 1795406 | 6/2007 |
| WO | 2004045928 | 6/2004 |
| WO | 2007122568 | 11/2007 |

* cited by examiner

WIPING DEVICE

BACKGROUND OF THE INVENTION

A wiper device, particularly a motor vehicle windscreen wiper device, having a retaining element comprising at least one longitudinal guide channel for guiding at least one spring element is already known in the art.

SUMMARY OF THE INVENTION

The invention is based on a wiper device, particularly a motor vehicle windscreen wiper device, having a retaining element comprising at least one longitudinal guide channel for guiding at least one spring element.

It is proposed that the retaining element comprises at least three fastening recesses offset in a longitudinal direction, which are provided to interlock with a wiper blade adapter, as a result of which a particularly rigid connection can be made between the retaining element and the wiper blade adapter. A "retaining element" in this context should be particularly understood to mean an element which is provided to connect a wind deflector element, a spring element and a wiper strip in an interlocking manner. "Fastening recesses offset in a longitudinal direction" should be particularly understood in this context to mean that at least one plane exists, which extends perpendicularly to the longitudinal direction and precisely intersects one of the fastening recesses. The fastening recesses are preferably spaced apart from one another viewed in the longitudinal direction. Arranged between each of the fastening recesses is a fastening recess-free area, in which a plane extending perpendicularly to the longitudinal direction does not intersect a fastening recess. A "wind deflector element" in this context should be particularly understood to mean an element which is provided to deflect a headwind acting on the wiper device and/or to use it to press a wiper strip against a vehicle pane. A "wiper strip" in this context should be particularly understood to mean a strip which is provided to wipe a vehicle windscreen. A "spring element" in this context should be particularly understood to mean a resilient element which comprises at least one extension, said extension being elastically variable in a normal operating state by at least 10%, particularly by at least 20%, preferably by at least 30% and particularly advantageously by at least 50%, and which particularly generates a counterforce which depends on a change in the extension and is preferably proportional to the change. A "longitudinal direction" in this context should particularly be understood to mean a direction which extends substantially parallel to a longitudinal extension of the retaining element. A "longitudinal extension" in this context should be particularly understood to mean a largest possible extension. "Substantially" in this context should be particularly understood to mean a deviation of less than 10°, preferably less than 5°. An "extension" of an element in this context should particularly be understood to mean a maximum distance between two points on a perpendicular projection of the element on a plane. A "longitudinal guide channel" in this context should particularly be understood to mean a guide channel, which extends parallel to a longitudinal direction of the retaining element. The longitudinal guide channel preferably comprises a free space and also at least one channel wall delimiting the free space. A "fastening recess" in this context should be particularly understood to mean a recess, which is provided to receive a corresponding fastening element. A "wiper blade adapter" in this context should be particularly understood to mean an adapter which exhibits a contact area to a wiper blade component and is connected to the wiper blade component in an undetachable manner and is provided to supply a connection area of the wiper blade component for a connection and/or contact with a wiper arm adapter. "Provided" should be understood to mean specially designed and/or equipped.

In a further preferred embodiment of the invention, it is proposed that the fastening recesses are arranged at least partially in a wind deflector fastening element which is provided to interlock with a wind deflector element, as a result of which a particularly narrow, rigid construction of the wiper device can be achieved. The wind deflector fastening element is preferably hook-shaped in design. The wind deflector fastening element preferably closes the retaining element in a side facing away from the wiper strip.

It is further proposed that the fastening recesses are arranged at least partially in a side wall which delimits the longitudinal guide channel laterally, as a result of which a particularly simple, flat construction of the wiper device can be achieved. "Laterally" in this context should be particularly understood to mean viewed in a wiping direction. A "wiping direction" in this context should be particularly understood to mean a direction in which the wiper device moves in an operating state relative to a surface to be wiped. The wiping direction preferably extends parallel to a surface to be wiped and/or perpendicularly to a main alignment of the wiper strip.

It is furthermore proposed that the wiper device comprises a wiper blade adapter, which is provided to be connected to the retaining element, by virtue of which a simple assembly of the wiper device can be achieved using a wiper arm adapter.

It is further proposed that the wiper blade adapter has at least one latching element which bears against the retaining element in a mounted state on a side facing the wiper strip and is provided to avoid movement of the wiper blade adapter relative to the retaining element in a vertical direction, by virtue of which quick, reliable assembly of the wiper device can be advantageously achieved. A "latching element" in this context should be particularly understood to mean a resilient element for producing a latching connection, which is provided to be resiliently deflected in an assembly.

If the wiper blade adapter comprises at least one latching element, which bears laterally against the retaining element in a mounted state and is provided to prevent movement of the wiper blade adapter relative to the retaining element in a longitudinal direction of the retaining element, quick, reliable assembly of the wiper device can be advantageously achieved.

In addition, it is proposed that the latching element bears laterally against the spring element in a mounted state and is provided to avoid movement of the wiper blade adapter relative to the spring element in a longitudinal direction, as a result of which additional spring element mounts can be avoided and/or weight can be saved.

In a further embodiment of the invention, it is proposed that the latching element is provided to be deflected at least substantially in a wiping direction in an assembly, as a result of which a particularly compact construction can be achieved with a simultaneously high operating safety.

If the latching element comprises at least two latching arms which are connected to the wiper blade adapter and are provided to be resiliently deflected, the latching element can have a particularly rigid, load-bearing design.

BRIEF DESCRIPTION OF THE DRAWINGS

Further advantages emerge from the following drawing description. Six exemplary embodiments of the invention are depicted in the drawing. The drawings, description and claims contain a plurality of combined features. The person skilled in the art will advantageously observe the features individually too and bring them together to create further appropriate combinations.

In the figures.

DETAILED DESCRIPTION

Figure 1:
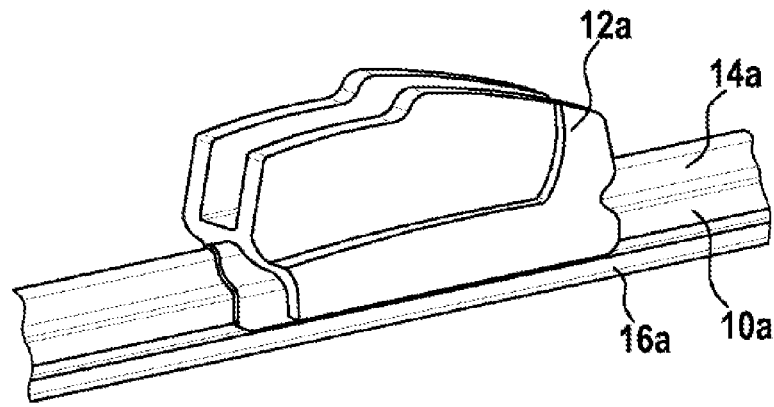
FIG. 1 shows a perspective view of a wiper device according to the invention with a retaining element.

FIG. 1 shows a perspective view of a wiper device according to the invention with a retaining element 10a, a wiper blade adapter 12a, a wind deflector element 14a and a wiper strip 16a in a mounted state. The wiper blade adapter 12a, the wind deflector element 14a and the wiper strip 16a are fastened to the retaining element 10a. The wiper blade adapter 12a is provided to be connected to a wiper arm (not shown). In an operating state, i.e. when the wiper arm executes a wiper movement, the wiper strip 16a is moved via the retaining element 10a over a surface to be wiped (not shown). When a headwind is encountered, the wind deflector element 14a deflects this and presses the wiper device onto the surface to be wiped.

Figure 2:
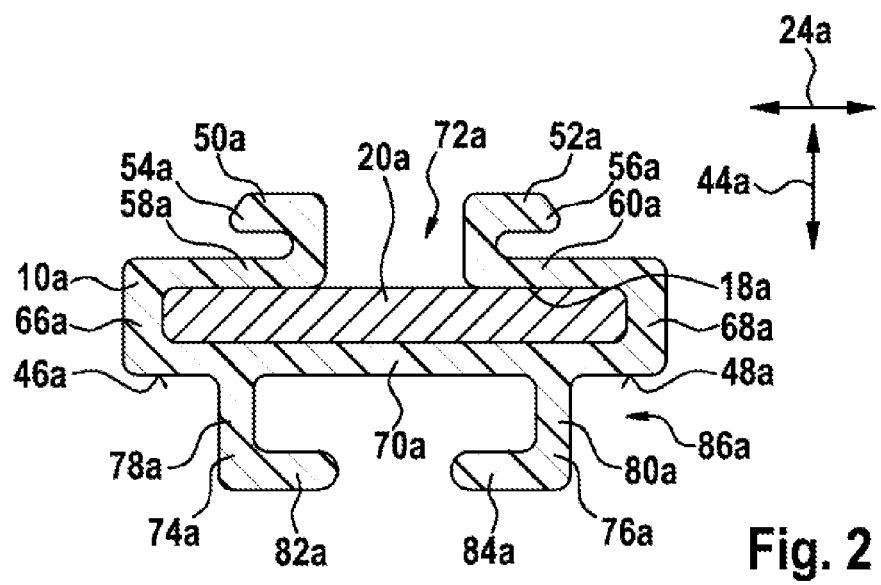
FIG. 2 shows a sectional view of the retaining element according to FIG. 1.

FIG. 2 shows the retaining element 10a, which comprises a longitudinal guide channel 18a to guide a spring element 20a, as a sectional view. The sectional plane runs perpendicularly to a longitudinal direction 22a of the retaining element 10a. The retaining element 10a has two wind deflector fastening elements 50a, 52a. The wind deflector fastening elements 50a, 52a are formed integrally with the retaining element 10a. The wind deflector fastening elements 50a, 52a point at their free ends 54a, 56a in directions facing away from one another. In addition, the wind deflector fastening elements 50a, 52a form two channel walls 58a, 60a, which bear against the longitudinal guide channel 18a on a side facing away from the wiper strip. The wind deflector fastening elements 50a, 52a are barb-shaped in design in the region of their free ends 54a, 56a. The ends 54a, 56a are enclosed by the wind deflector element 14a in a mounted state.

To guide the spring element 20a, side walls 66a, 68a of the longitudinal guide channel 18c bear against the channel walls 58a, 60a. The channel walls 58a, 60a thereby enclose a right angle with the side walls 66a, 68a. In addition, a partition wall 70a is arranged at the side walls 66a, 68a, which closes the longitudinal guide channel 18a in the direction of the wiper strip 16a. The side walls 66a, 68a extend from the partition wall 70a in a direction facing away from the wiper strip 16a. The retaining element 10a has a longitudinal opening 72a, which opens the longitudinal guide channel 18a towards the wind deflector element 14a.

Two L-shaped guide profiles 74a, 76a of the retaining element 10a are arranged on the partition wall 70a. The guide profiles 74a, 76a are formed integrally with the retaining element 10a. The guide profiles 74a, 76a each have a lateral guide 78a, 80a and a vertical guide 82a, 84a. The vertical guides 82a, 84a each enclose an angle of 90° with the lateral guides 78a, 80a. The lateral guides 78a, 80a each enclose an angle of 90° relative to the partition wall 70a. The guide profiles 74a, 76a point at their free ends of the vertical guides 82a, 84a in directions facing one another. The guide profiles 74a, 76a and the partition wall 70a form a welt track 86a, into which the wiper strip 16a is inserted in a mounted state.

The retaining element 10a is produced integrally from polyethylene by an extrusion process. A person skilled in the art will consider different plastics which seem appropriate in this context, such as polypropylene, polyamide, polyvinyl chloride, polycarbonate and/or polystyrene in particular.

Figure 3:
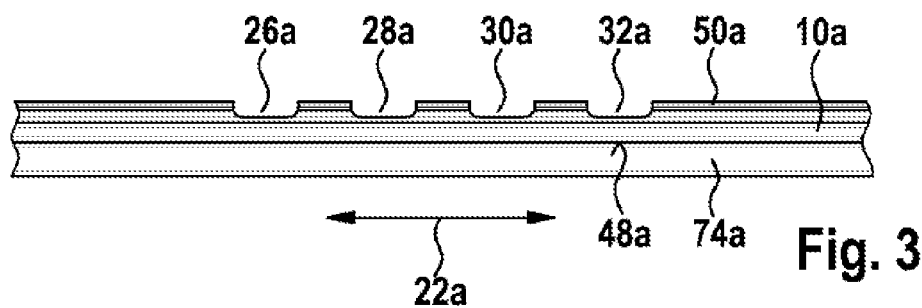
FIG. 3 shows a side view of the retaining element according to FIG. 1.

The retaining element 10a has four fastening recesses 26a, 28a, 30a, 32a offset in the longitudinal direction 22a, which are provided to interlock with the wiper blade adapter 12a. The fastening recesses 26a, 28a, 30a, 32a are arranged in the wind deflector fastening elements 50a, 52a which are provided to interlock with a wind deflector element 14a. The fastening recesses 26a, 28a, 30a, 32a extend continuously through both wind deflector fastening elements 50a, 52a (FIG. 3) viewed in the wiping direction 24a.

Figure 4:
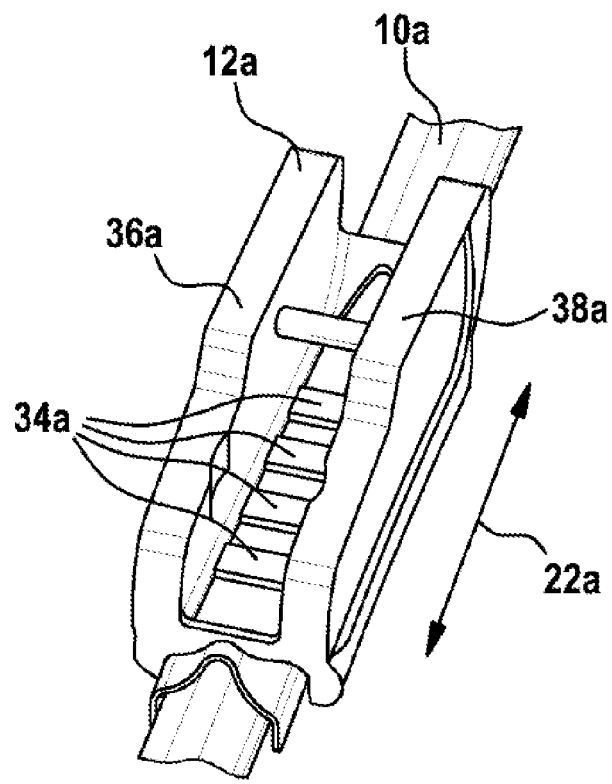
FIG. 4 shows a perspective view of a wiper blade adapter and the retaining element according to FIG. 1.

For assembly, the wiper blade adapter 12a is mounted on the retaining element 10a (FIG. 4). The wiper blade adapter 12a has four bridge webs 34a, which extend from a side wall 36a of the wiper blade adapter 12a to an opposite side wall 38a of the wiper blade adapter 12a viewed in the wiping direction. The bridge webs 34a extend in their main extension parallel to the wiping direction 24a. In an assembly, the bridge webs 34a engage in interlocking fashion with the fastening recesses 26a, 28a, 30a, 32a and completely fill these. A movement of the wiper blade adapter 12a relative to the retaining element 10a is thereby avoided in the longitudinal direction 22a and in the wiping direction 24a.

Figure 5:
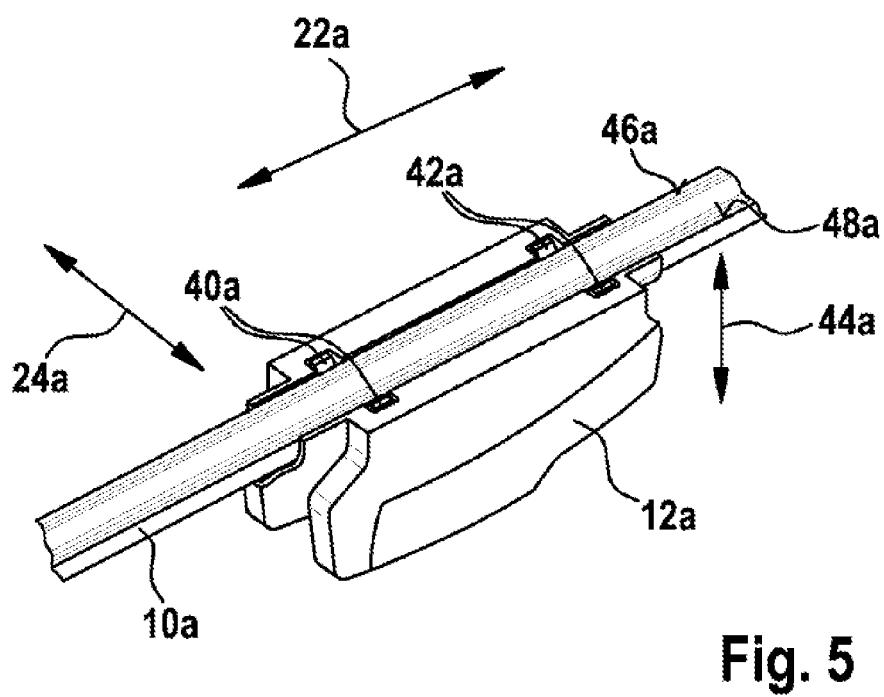
FIG. 5 shows a further perspective view of the wiper blade adapter and the retaining element according to FIG. 1.

The wiper blade adapter 12a has four latching elements 40a, 42a, which bear against the retaining element 10a in the mounted state on a side 46a, 48a facing the wiper strip and are provided to prevent movement of the wiper blade adapter 12a relative to the retaining element 10a in a vertical direction 44a (FIG. 5). The vertical direction 44a extends perpendicularly to the longitudinal direction 22a and perpendicularly to the wiping direction 24a. In an operating state, the vertical direction 44a is therefore at least substantially perpendicular to a surface to be wiped (not shown). The latching elements 40a, 42a are initially resiliently deflected from a starting position in the wiping direction 24a in an assembly and then move back into the starting position independently. A movement of the wiper blade adapter 12a relative to the retaining element 10a is therefore avoided in the vertical direction 44a.

Finally, the spring element 20a is inserted into the longitudinal guide channel 18a in the longitudinal direction 22a in an assembly. The wind deflector element 14a is pushed in the longitudinal direction 22a via the wind deflector fastening elements 50a, 52a and is therefore likewise connected to the retaining element 10a.

Five further exemplary embodiments of the invention are shown in FIGS. 6 to 20. The following descriptions are substantially limited to the differences between the exemplary embodiments, wherein reference can be made to the description of the first exemplary embodiment in relation to unchanging components, features and functions. To distinguish between the exemplary embodiments, letter a in the reference numbers in the exemplary embodiment in FIGS. 1 to 5 is replaced with letters b to fin the reference numbers of the exemplary embodiments in FIGS. 6 to 20. In relation to unchanging components, particularly in relation to components with the same reference numbers, reference can also be made in principle to the drawings and/or the description of the first exemplary embodiments.

Figure 6:
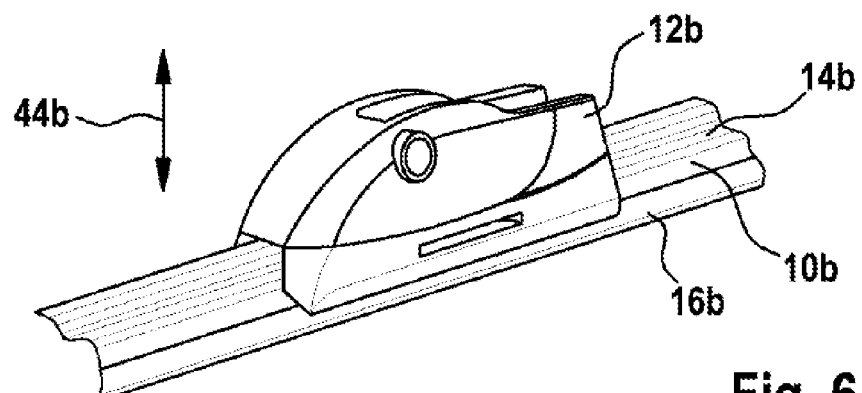
FIG. 6 shows a perspective view of a further exemplary embodiment of a wiper device according to the invention with a retaining element.

FIG. 6 shows a perspective view of a further exemplary embodiment of a wiper device according to the invention having a retaining element 10b, a wiper blade adapter 12b, a wind deflector element 14b and a wiper strip 16b in a mounted state. The wiper blade adapter 12b, the wind deflector element 14b and the wiper strip 16b are fastened to the retaining element 10b. The wiper blade adapter 12b is provided to be connected to a wiper arm (not shown). The wiper strip 16b is moved over a surface to be wiped (not shown) via the retaining element 10b in an operating state, i.e. when the wiper arm executes a wiping movement. When a headwind is encountered, the wind deflector element 14b deflects it and presses the wiper device against the surface to be wiped. The retaining element 10b has a cross section as shown in FIG. 2.

Figure 7:
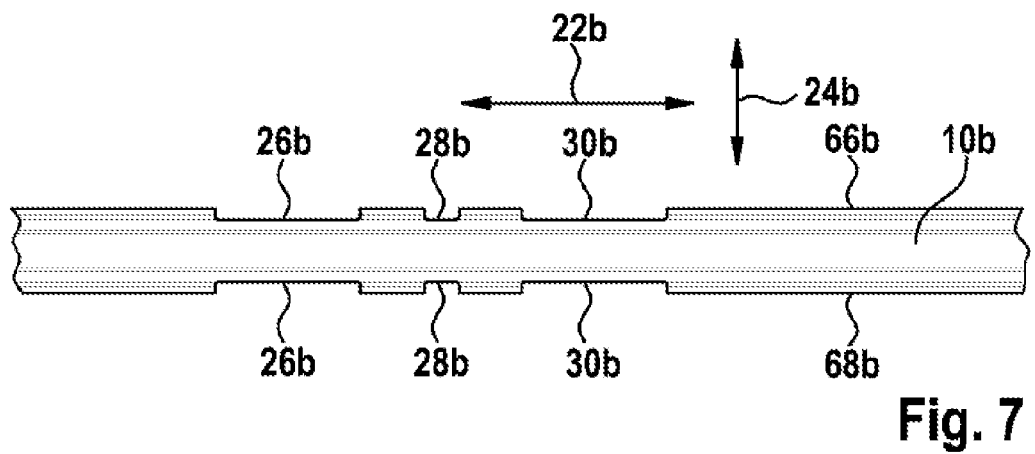
FIG. 7 shows a top view of the retaining element according to FIG. 6.

FIG. 7 shows a top view of the retaining element 10b. The retaining element 10b comprises three fastening recesses 26b, 28b, 30b offset in a longitudinal direction 22b viewed in the wiping direction 24b, which are provided to interlock with the wiper blade adapter 12b. The fastening recesses 26b, 28b, 30b are arranged in side walls 66b, 68b, which laterally delimit a longitudinal guide channel 18b.

Figure 8:
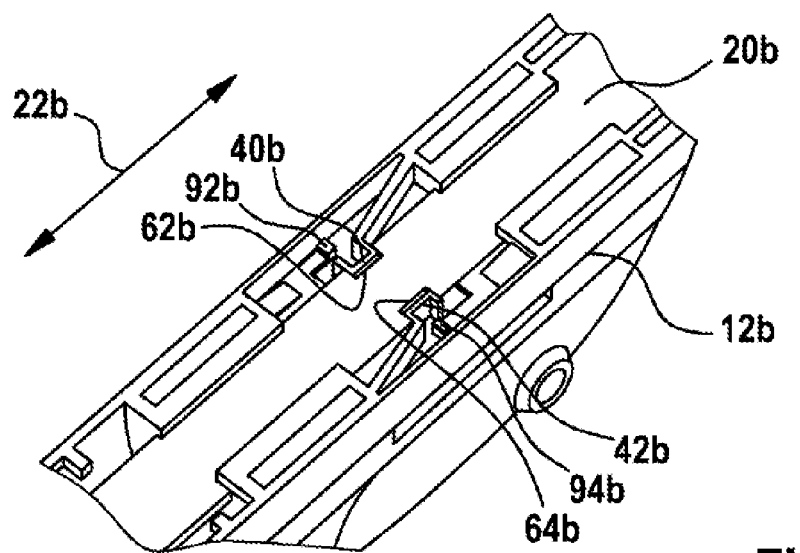
FIG. 8 shows a perspective view of a wiper blade adapter and a spring element of the wiper device according to FIG. 6.
Figure 9:
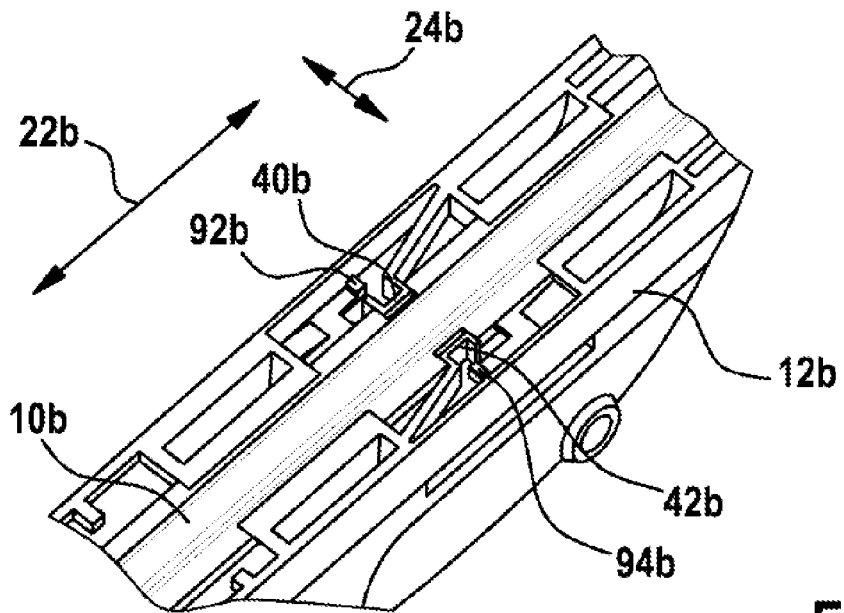
FIG. 9 shows a perspective view of the wiper blade adapter and the retaining element of the wiper device according to FIG. 6.

The wiper blade adapter 12b comprises two latching elements 40b, 42b which bear laterally against the spring element 20b in a mounted state and prevent movement of the wiper blade adapter 12b relative to the spring element 20b in the longitudinal direction 22b (FIG. 8). For the sake of clarity, the retaining element 10b is not shown in FIG. 8. The latching elements 40b, 42b engage with latching recesses 62b, 64b arranged laterally in the spring element 20b in this case.

The latching elements 40b, 42b likewise bear laterally against the retaining element 10b (FIG. 9) in the mounted state. The latching elements 40b, 42b engage with the fastening recesses 28b in this case and thereby also prevent movement of the wiper blade adapter 12b relative to the retaining element 10b in the longitudinal direction 22b. In addition, the wiper blade adapter 12b engages with the fastening recesses 26b, 30b and thereby forms a further interlock acting in the longitudinal direction 22b.

Figure 10:
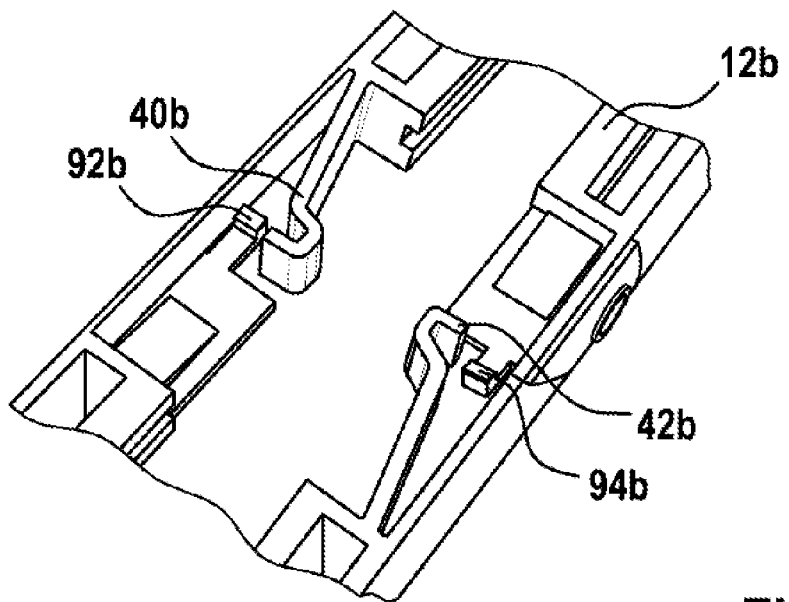
FIG. 10 shows a perspective view of the wiper blade adapter of the wiper device according to FIG. 6.

The latching elements 40b, 42b are initially deflected resiliently from a starting position in the wiping direction 24b in an assembly and then move back into the starting position independently. In this case, two securing means 92b, 94b of the wiper blade adapter 12b each engage laterally with a latching element 40b, 42b and prevent renewed deflection of the latching elements 40b, 42b. The securing means 92b, 94b can only be deflected in a vertical direction 44b. Should the latching elements 40b, 42b be deflected, the securing means 92b, 94b must be deflected to begin with (FIG. 10).

Figure 11:
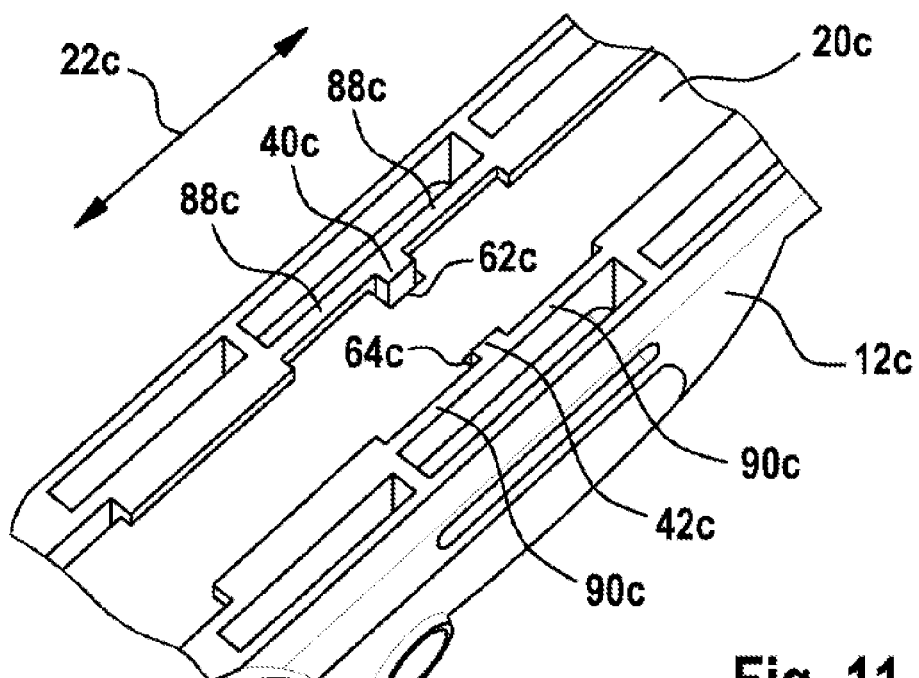
FIG. 11 shows a perspective view of a wiper blade adapter and a spring element of a further exemplary embodiment of a wiper device.

FIG. 11 shows a further exemplary embodiment of the invention, which substantially corresponds to the exemplary embodiment shown in FIGS. 6 to 10. Two latching elements 40c, 42c arranged on a wiper blade adapter 12c each have two latching arms 88c, 90c, which are connected to the wiper blade adapter 12c. The latching arms 88c, 90c each extend in a longitudinal direction 22c of a retaining element 10c. The latching arms 88c, 90c are formed integrally with the wiper blade adapter 12c and can be deflected resiliently in a wiping direction 24c. In addition, the latching arms 88c, 90c are produced from plastic. The latching elements 40c, 42c bear laterally against a spring element 20c in the mounted state and prevent movement of the wiper blade adapter 12c relative to the spring element 20c in the longitudinal direction 22c. For the sake of clarity, the retaining element 10c is not shown in FIG. 11.

Figure 12:
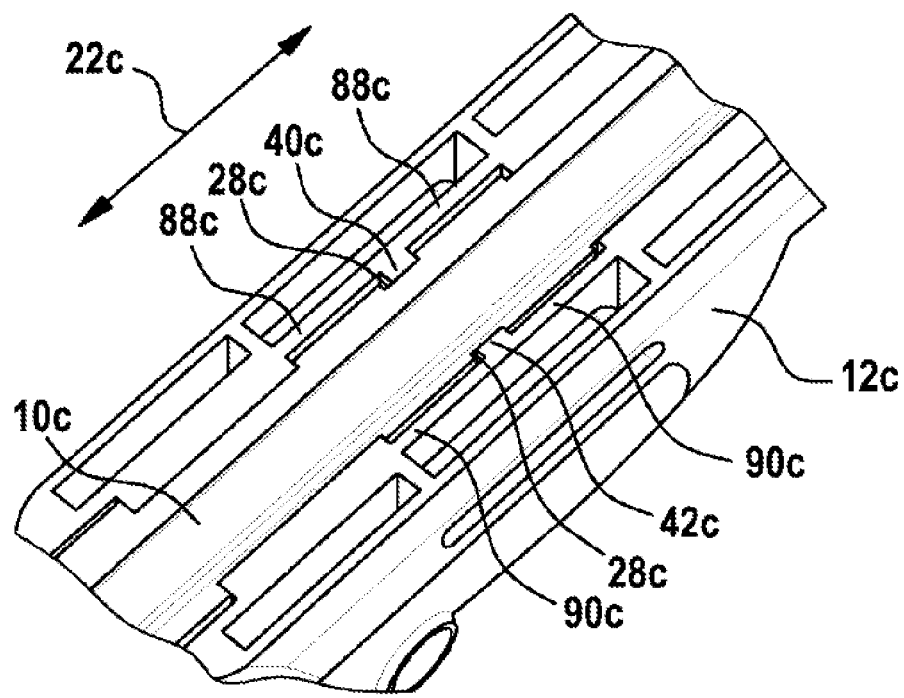
FIG. 12 shows a perspective view of the wiper blade adapter and a retaining element of the wiper device according to FIG. 11

FIG. 12 shows a perspective view of the wiper blade adapter 12c with the retaining element 10c. The latching elements 40c, 42c bear laterally against the retaining element 10c in a mounted state. The latching elements 40c, 42c engage with the fastening recesses 28c in this case and prevent movement of the wiper blade adapter 12c relative to the retaining element 10c in the longitudinal direction 22c.

Figure 13:
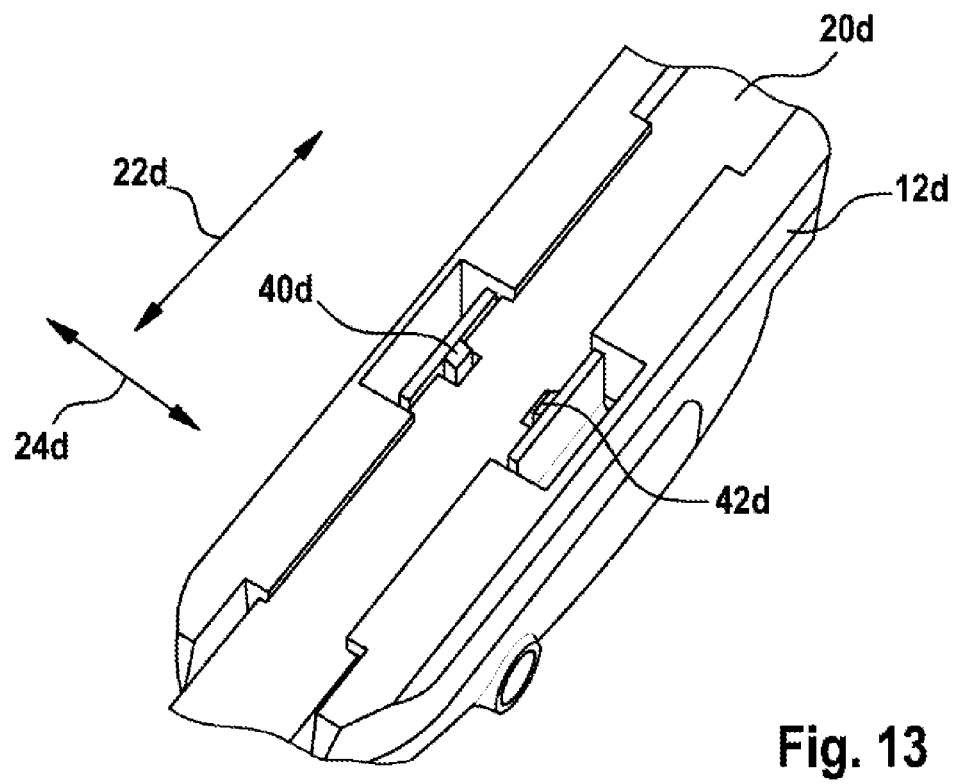
FIG. 13 shows a perspective view of a wiper blade adapter and a spring element of a further exemplary embodiment of a wiper device.

FIG. 13 shows a further exemplary embodiment of the invention which substantially corresponds to the exemplary embodiment shown in FIGS. 6 to 10. Two latching elements 40d, 42d arranged on a wiper blade adapter 12d can be deflected about a longitudinal axis which extends parallel to a longitudinal direction 22d. The latching elements 40d, 42d are initially deflected resiliently from a starting position into a wiping direction 24d in an assembly and then move back into the starting position independently. In the mounted state, the latching elements 40d, 42d bear laterally against a spring element 20d and prevent movement of the wiper blade adapter 12d relative to the spring element 20d in a longitudinal direction 22d. For the sake of clarity, a retaining element 10d is not shown in FIG. 13.

Figure 14:
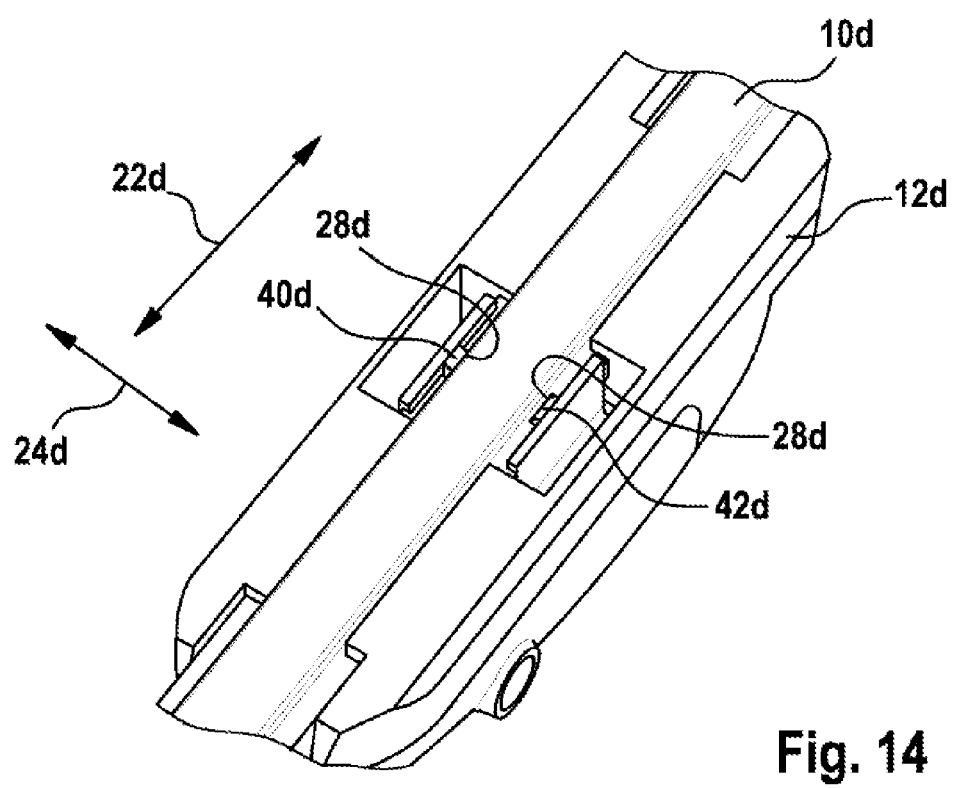
FIG. 14 shows a perspective view of the wiper blade adapter and a retaining element of the wiper device according to FIG. 13.

FIG. 14 shows a perspective view of the wiper blade adapter 12d with the retaining element 10b. The latching elements 40d, 42d bear laterally against the retaining element 10d in a mounted state. The latching elements 40d, 42d engage with fastening recesses 28d in this case and prevent movement of the wiper blade adapter 12d relative to the retaining element 10d in the longitudinal direction 22d.

Figure 15:
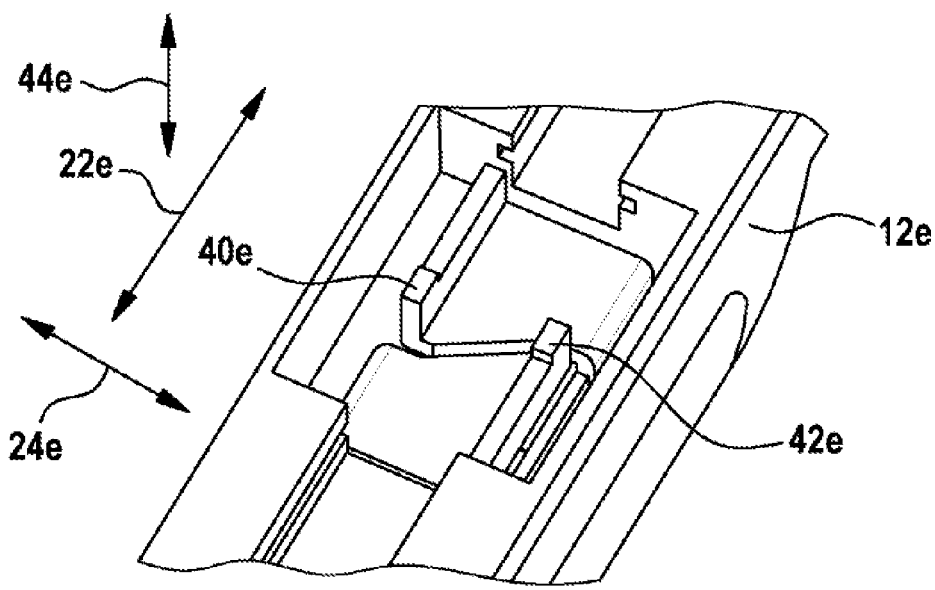
FIG. 15 shows a perspective view of a wiper blade adapter of a further exemplary embodiment of a wiper device.

FIG. 15 shows a further exemplary embodiment of the invention which substantially corresponds to the exemplary embodiment shown in FIGS. 6 to 10. Two latching elements 40e, 42e arranged on a wiper blade adapter 12e are deflectable about a longitudinal axis which extends parallel to a longitudinal direction 22e. The latching elements 40e, 42e extend substantially in a wiping direction 24e and are initially deflected resiliently from a starting position in a vertical direction 44e in an assembly and then move independently back into the starting position.

Figure 16:
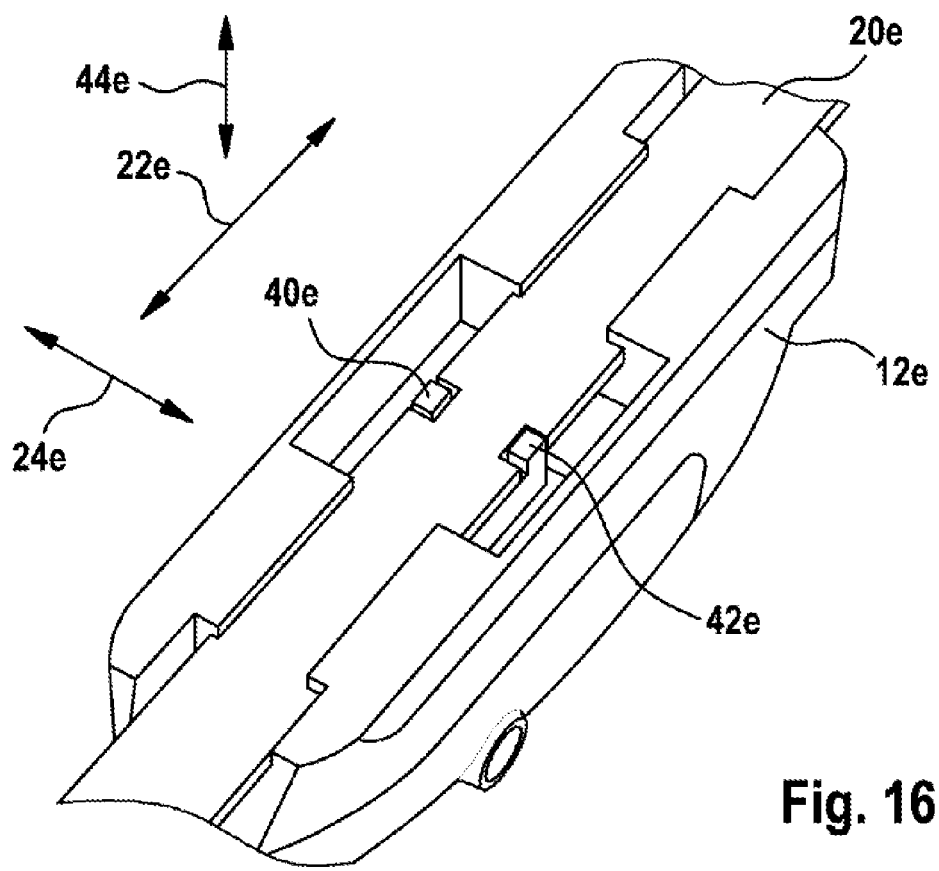
FIG. 16 shows a perspective view of the wiper blade adapter and a spring element of the wiper device according to FIG. 15.

In the mounted state, the latching elements 40e 42e bear laterally against a spring element 20e and prevent movement of the wiper blade adapter 12e relative to the spring element 20e in the longitudinal direction 22e (FIG. 16). For the sake of clarity, a retaining element 10e is not shown in FIG. 16.

Figure 17:
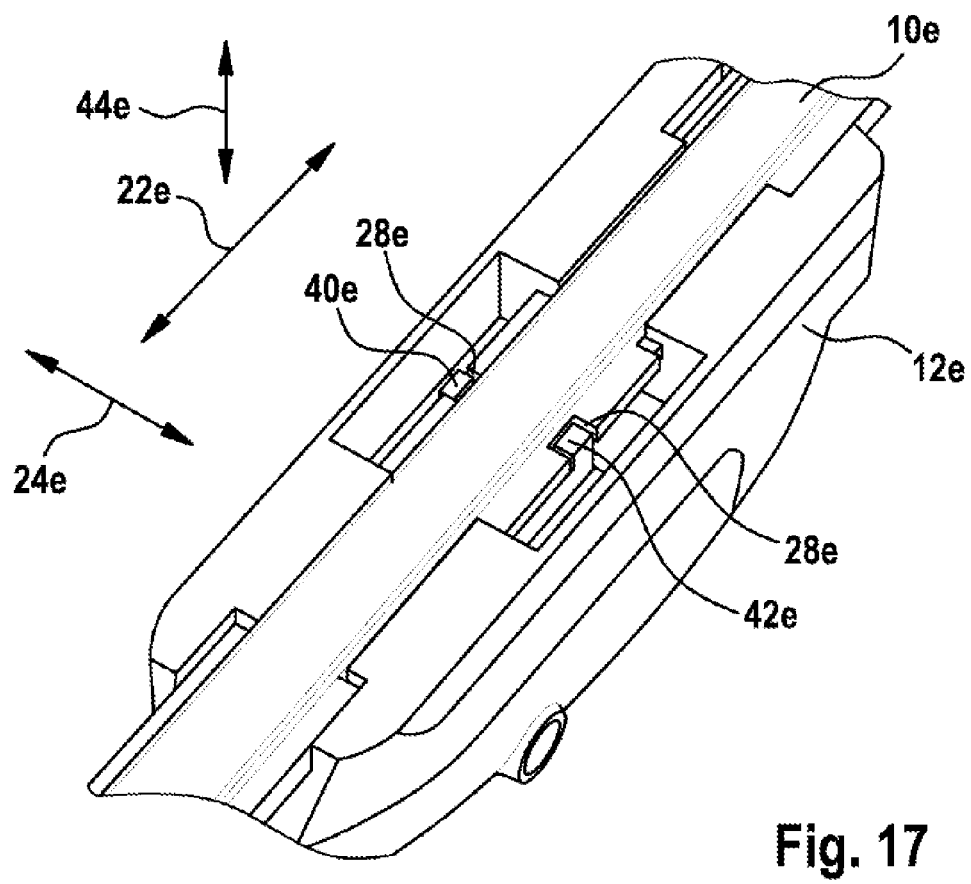
FIG. 17 shows a perspective view of the wiper blade adapter and a retaining element of the wiper device according to FIG. 15.

FIG. 17 shows a perspective view of the wiper blade adapter 12e with the retaining element 10e. The latching elements 40e, 42e bear laterally against the retaining element 10e in a mounted state. The latching elements 40e, 42e thereby engage with fastening recesses 28e and prevent movement of the wiper blade adapter 12e relative to the retaining element 10e in the longitudinal direction 22e.

Figure 18:
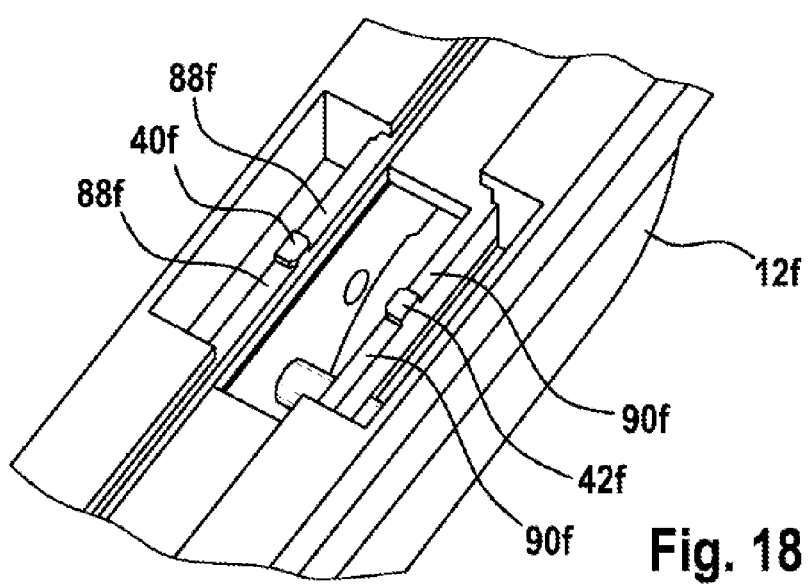
FIG. 18 shows a perspective view of a wiper blade adapter of a further exemplary embodiment of a wiper device.

FIG. 18 shows a further exemplary embodiment of the invention which substantially corresponds to the exemplary embodiment shown in FIGS. 6 to 10. Two latching elements 40f, 42f arranged on a wiper blade adapter 12f each have two latching arms 88f, 90f which are connected to the wiper blade adapter 12f. The latching arms 88f, 90f each extend in a longitudinal direction 22f of a retaining element 10f. The latching arms 88f, 90f are formed integrally with the wiper blade adapter 12f and can be deflected resiliently in the vertical direction 44f. In addition, the latching arms 88f, 90f are produced from plastic.

Figure 19:
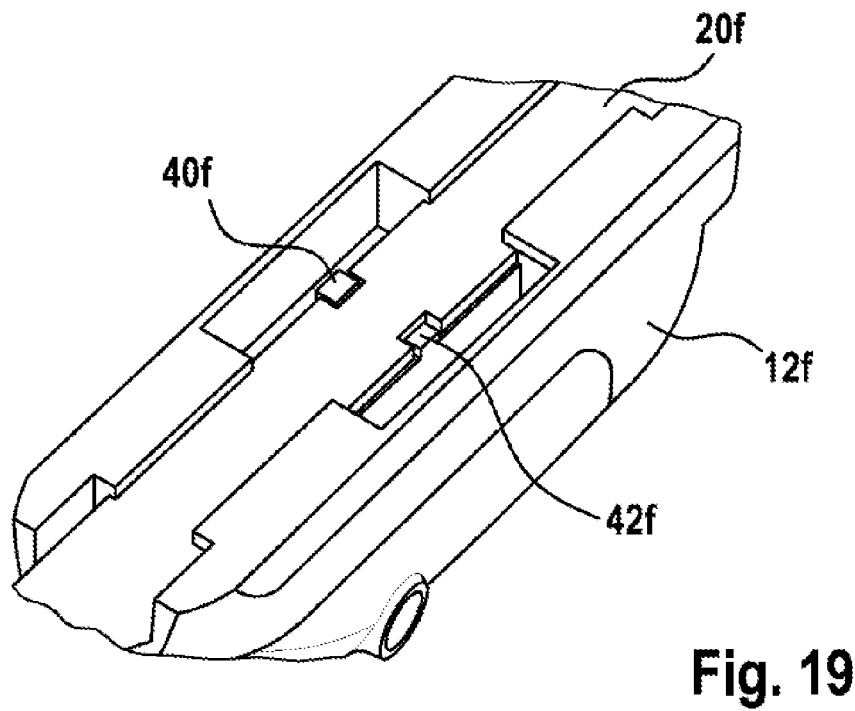
FIG. 19 shows a perspective view of the wiper blade adapter and a spring element of the wiper device according to FIG. 18

In the mounted state, the latching elements 40f, 42f bear against a side of a spring element 20f facing away from the wiper strip and prevent movement of the wiper blade adapter 12f relative to the spring element 20f in the longitudinal direction 22f (FIG. 19). For the sake of clarity, the retaining element 10f is not shown in FIG. 19.

Figure 20:
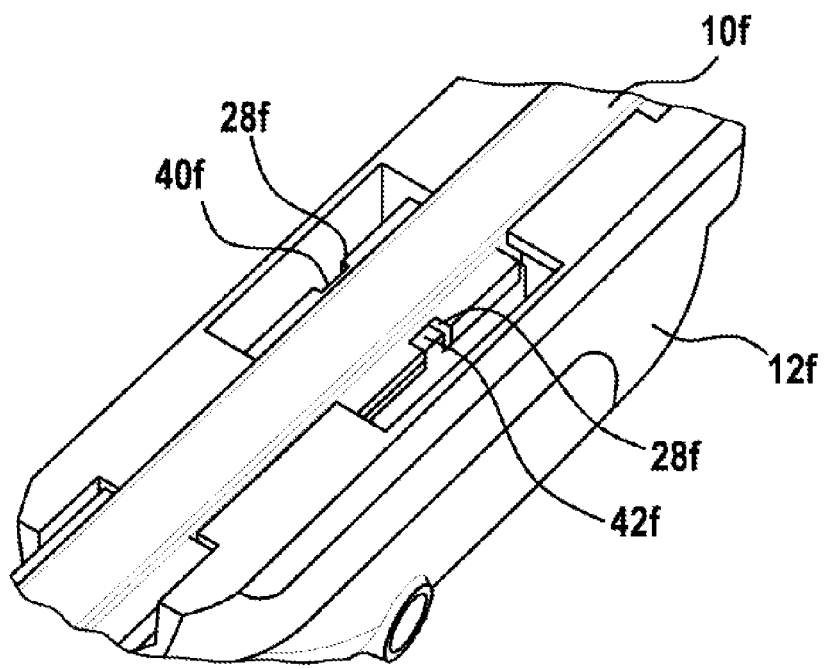
FIG. 20 shows a perspective view of the wiper blade adapter and a retaining element of the wiper device according to FIG. 18.

FIG. 20 shows a perspective view of the wiper blade adapter 12f with the retaining element 10f. In a mounted state the latching elements 40f, 42f bear against the retaining element 10f on a side facing away from the wiper strip. The latching elements 40f, 42f engage with the fastening recesses 28f in this case and prevent movement of the wiper blade adapter 12f relative to the retaining element 10f in the longitudinal direction 22f.

What is claimed is:

1. A wiper device, comprising a retaining element (10a-10f) including at least one longitudinal guide channel (18a-18f) for guiding at least one spring element (20a-20f), characterized in that the retaining element (10a-10f) comprises at least three fastening recesses (26a-26f, 28a-28f, 30a-30f, 32a) offset in a longitudinal direction (22a-22f), the wiper device further comprising a wiper blade adapter (12a-12f) interlocked to the retaining element (10a-10f) in the fastening recesses (26a-26f, 28a-28f, 30a-30f, 32a), wherein the fastening recesses (26a, 28a, 30a, 32a) are arranged at least partially in a wind deflector fastening element (50a, 52a) of the retaining element (10a-10f), wherein the wind deflector fastening element (50a, 52a) interlocks with a wind deflector element (14a) of the wiper device.

2. The wiper device as claimed in claim 1, further comprising a wiper strip fastened to the retaining element, wherein the wiper blade adapter (12a) comprises at least one latching element (40a, 42a), which bears laterally against the retaining element (10a) in a mounted state on a side facing the wiper strip (46a, 48a) and is provided to prevent movement of the wiper blade adapter (12a) relative to the retaining element (10a) in a vertical direction (44a).

3. The wiper device at least as claimed in claim 1, characterized in that the wiper blade adapter (12b-12f) comprises at least one latching element (40b-40f, 42b-42f), which bears laterally against the retaining element (10b-10f) in a mounted state and is provided to prevent movement of the wiper blade adapter (12b-12f) relative to the retaining element (10b-10f) in a longitudinal direction (22b-22f) of the retaining element (10b-10f).

4. The wiper device as claimed in claim 3, characterized in that the latching element (40b-40f, 42b-42f) bears laterally against the spring element (20b-20f) in a mounted state and is provided to avoid movement of the wiper blade adapter (12b-12f) relative to the spring element (20b-20f) in a longitudinal direction (22b-22f).

5. The wiper device at least as claimed in claim 3, characterized in that the latching element (40b-40d, 42b-42d) is provided to be deflected at least substantially in a wiping direction (24b-24d) in an assembly.

6. The wiper device at least as claimed in claim 3, characterized in that the latching element (40c; 40f, 42c; 42f) comprises at least two latching arms (88c; 88f, 90c; 90f) which are connected to the wiper blade adapter (12c; 12f) and are provided to be resiliently deflected.

7. The wiper device as claimed in claim 1, further comprising a wiper strip fastened to the retaining element.

8. The wiper device as claimed in claim 1, further comprising a wind deflector element interlocking with the wind deflector fastening element (50a, 52a).

9. The wiper device as claimed in claim 1, wherein the wind deflector fastening element (50, 52a) has an L-shaped cross-section.

10. The wiper device as claimed in claim 1, wherein the wind deflector fastening element (50a, 52a) is provided to releasably interlock with the wind deflector element (14a), such that the wind deflector (14a) is moved along the longitudinal direction (22a-22f) into the wind deflector fastening element (50a, 52a) during an assembly.

11. The wiper device as claimed in claim 1, wherein the wind deflector fastening element (50a, 52a) is a first wind deflector fastening element (50a, 52a), and wherein the retaining element (10a-10f) includes a second wind deflector fastening element (50a, 52a).

12. The wiper device as claimed in claim 1, wherein free ends of the first and second wind deflector fastening elements (50a, 52a) face in opposite directions.

13. The wiper device as claimed in claim 1, wherein the longitudinal guide channel (18a-18f) is spatially offset from the wind deflector fastening element (50a, 52a) along a vertical direction (44a), wherein the vertical direction (44a) is perpendicular to the longitudinal direction (22a-22f) and to a wiping direction (24a-24f).

14. The wiper device as claimed in claim 1, wherein the wiper blade adapter (12a-12f) includes bridge webs (34a) that interlock with the fastening recesses (26a-26f, 28a-28f, 30a-30f, 32a).

* * * * *